Oct. 8, 1929.  C. W. COURCIER  1,731,159
AUTOMATIC LUBRICATOR
Filed July 7, 1926  2 Sheets-Sheet 1
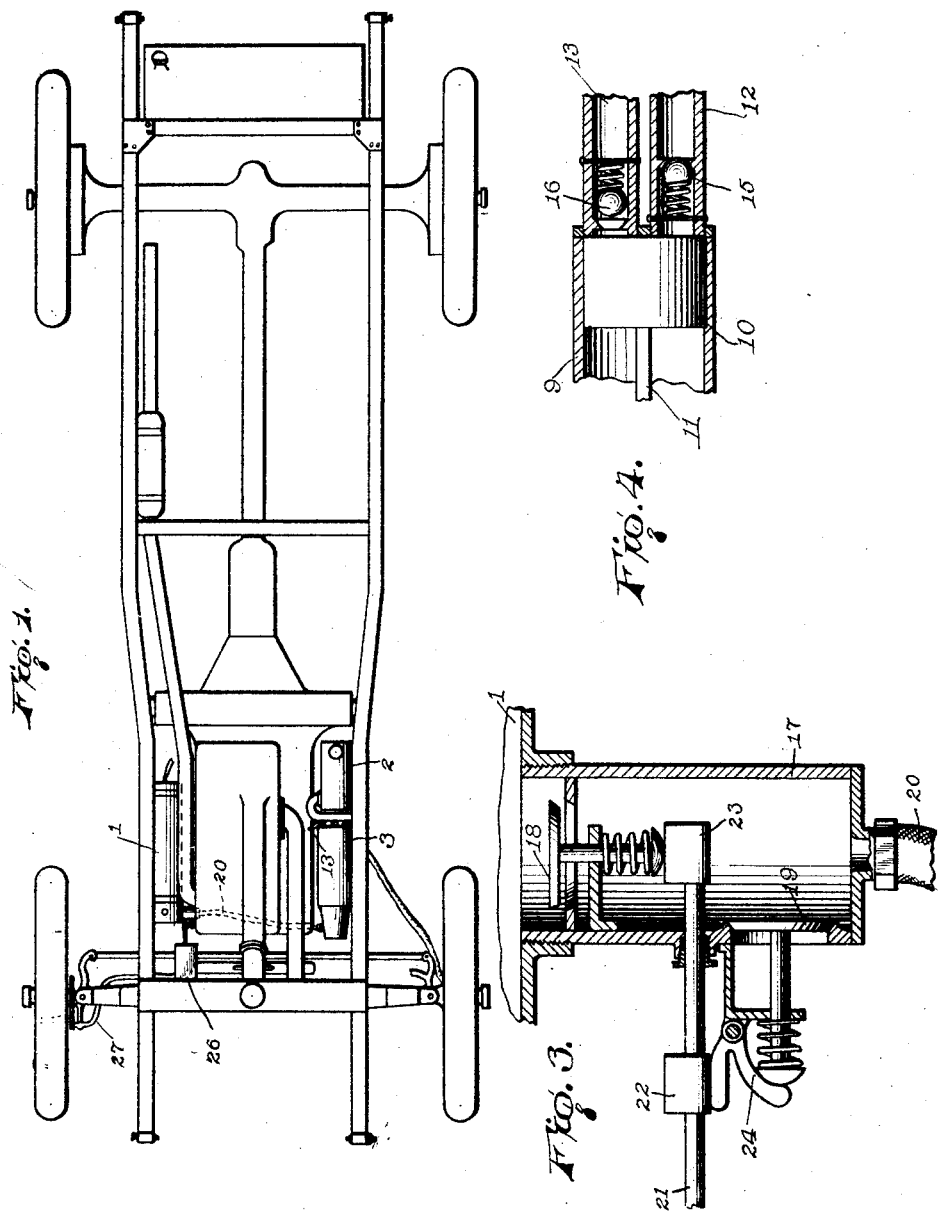

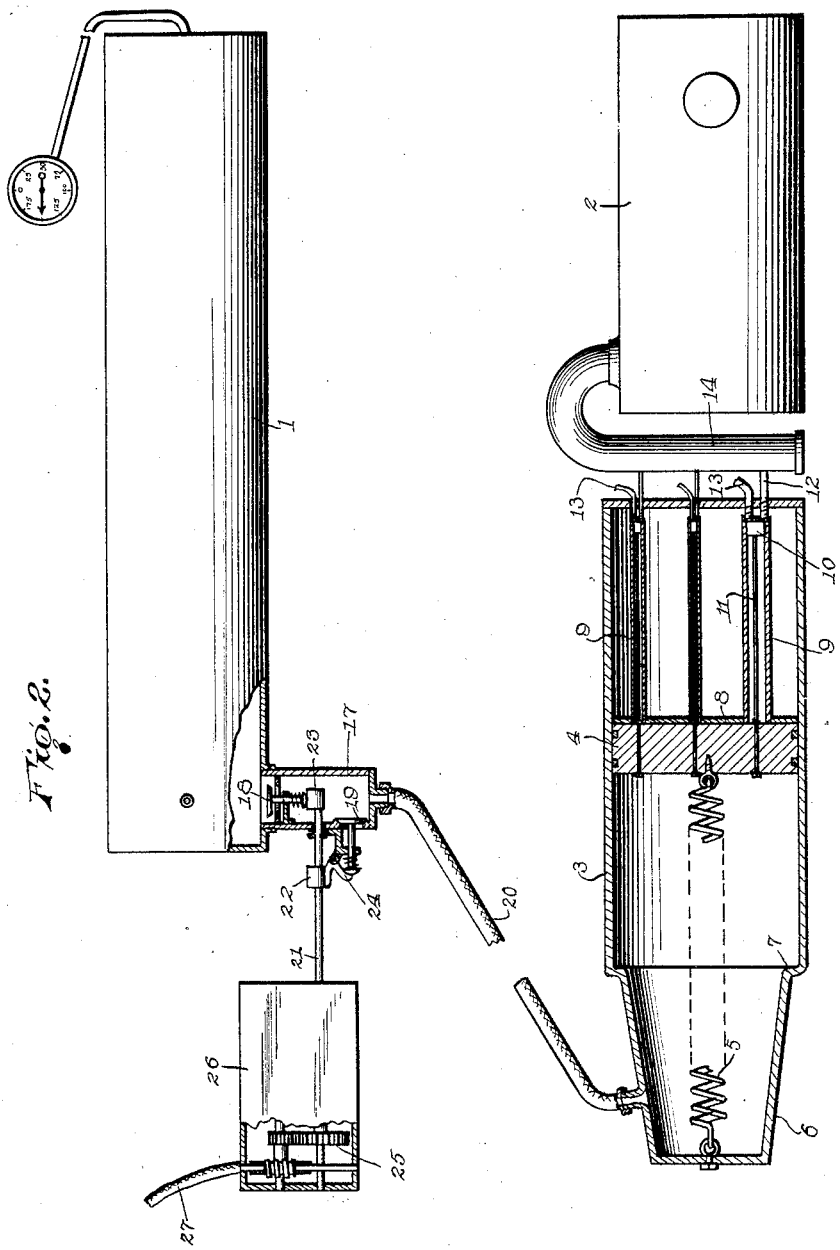

Patented Oct. 8, 1929

1,731,159

UNITED STATES PATENT OFFICE

CICERO WILL COURCIER, OF RUSH SPRINGS, OKLAHOMA

AUTOMATIC LUBRICATOR

Application filed July 7, 1926. Serial No. 120,935.

The object of this invention is the provision of means for automatically supplying oil, grease or other lubricant to a number of different parts, said supply being constant and in regulated quantity to prevent waste.

Specifically considered the purpose of the invention is to lubricate the various parts of an automobile, or analogous motor vehicle without the attention usually required to prevent any of the parts becoming dry and the consequent burning of bearings.

In accordance with the invention the lubricant in bulk is held in a container and is drawn therefrom at intervals and positively supplied to the moving parts to be lubricated. Compressed air from a reservoir is utilized to effect delivery of the lubricant, a valve mechanism being provided to control the flow of the air as required.

While the drawings illustrate a preferred embodiment of the invention, it is to be understood that in adapting the means to meet specific needs and requirements the design may be varied and changes in the minor details of construction may be resorted to within the scope of the invention as claimed, without departing from the spirit thereof.

For a full understanding of the invention and the merits thereof, reference is to be had to the following description and the drawings hereto attached, in which,—

Figure 1 is a top plan view of the chassis of a motor vehicle provided with automatic lubricating means embodying the invention, Figure 2 is a diagrammatic view of the automatic lubricator, Figure 3 is an enlarged sectional view of the valve mechanism for controlling the flow of compressed air to the distributor, and Figure 4 is an enlarged sectional view of the valve mechanism for controlling the lubricant.

Corresponding and like parts are referred to in the following description and designated in the several views of the drawings by like reference characters.

As hereinbefore stated the invention is primarily intended for automobiles and motor vehicles generally, hence in Figure 1 the same is shown in such application, the component parts being conveniently disposed according to the available space in the particular type of machine having the lubricator installed thereon.

The numeral 1 designates a reservoir or tank for receiving the fluid pressure medium such as compressed air. The numeral 2 indicates the container holding the lubricant in bulk, and 3 the distributor in which operates a piston 4. A contractile helical spring 5 cooperates with the piston 4 to normally hold it at the limit of its rearward stroke. The cylinder 3 has an extension 6 to receive the spring 5 when the same is contracted and the piston 4 is at the limit of its rearward stroke. The spring 5 is always under tension. The inner shoulder 7 formed at the juncture of the extension 6 with the cylinder 3 limits the rearward movement of the piston 4. A partition 8 divides the cylinder 3 into two compartments, the one receiving the piston 4 and the other receiving a plurality of cylinders 9 which are connected at one end to the partition 8. The cylinders 9 are of different diameters, hence vary in capacity. The cylinders 9 are of a uniform length and each receives a piston 10 which is connected by means of a rod 11 to the piston 4, whereby the series of pistons 4 and 10 move in unison. Two tubes 12 and 13 are connected to each of the cylinders 9. The tubes 12 connect with a header 14 which is in communication with the tank 2. The tubes 13 extend to the various moving parts to be lubricated. Some of the parts require a greater amount of lubrication than other parts, and for this reason the cylinders 9 vary in capacity. The larger cylinders 9 are connected to the parts requiring a great amount of lubrication and the small cylinders 9 are connected to the parts requiring but very little lubrication. Each of the tubes 12 has an intake valve 15 and each of the tubes 13 has an outlet valve 16. On the rearward stroke of the piston 4 each of the pistons 10 receives a like movement in its respective cylinder 9, thereby drawing a supply of lubricant from the tank 2 through the header 14 and tubes 12. Upon the forward stroke of the piston 4 the several pistons 10 receive a like movement, which effects a delivery of the lubricant from the cylinders 9 through the tubes 13 to the several parts to be lubricated. Upon the rearward stroke of the pistons 10 the intake valves 15 unseat and the outlet valves 16 close and upon the forward stroke of the pistons 10 the intake valves 15 close and the outlet valves 16 open or unseat to permit discharge of the lubricant through the tubes 13.

The valve mechanism associated with the fluid pressure reservoir 1 comprises a casing 17 and valves 18 and 19. The valve 18 cuts off the outflow of the fluid pressure from the reservoir 1. The valve 19 prevents the escape of the fluid pressure from the casing 17 when the valve 18 is unseated. A tube 20 connects the valve casing 17 with the extension 6 of the cylinder 3. When the valve 18 is unseated and the valve 19 is closed, the fluid pressure from the reservoir 1 enters the extension 6 and exerts a pressure upon the piston 4 to move the same forward and the pistons 10 connected therewith, whereby to expel the lubricant from the cylinders 9 and supply the same to the parts to be lubricated through the tubes 13. When the valve 18 is closed and the valve 19 unseated, the pressure from the cylinder 3 is afforded an escape into the atmosphere. At this time the piston 4 is drawn rearward by means of the spring 5, thereby drawing a supply of lubricant from the tank 2 into the cylinders 9. When the piston 4 reaches the limit of its rearward movement the valve 19 closes and the valve 18 opens, thereby permitting pressure from the reservoir 1 to enter the cylinder 3 and act upon the piston 4 to advance it and the pistons 10, whereby to supply lubricant to the parts in the manner stated. The valves 18 and 19 are normally held seated by means of springs applied to the respective stems thereof.

Suitable mechanism is provided for positively unseating the valves 18 and 19 and this mechanism includes a shaft 21 and tappets 22 and 23 fast thereto, the tappet 23 being positioned to engage the stem of the valve 18 and the tappet 22 being disposed to engage one arm of a bell crank 24 which is located so that its other arm engages the stem of the valve 19. When the valve 18 is seated the valve 19 is open and vice versa. The shaft 21 is operated by a train of gearing 25 located in a casing 26 which is conveniently positioned. The train of gearing 25 is stepped down so as to impart an exceedingly slow movement to the shaft 21. The ratio of the gearing will depend upon the required rotation of the shaft 21 to effect positive and ample supply of lubricant to the parts without waste. The train of gearing 25 may be operated from a convenient part of the vehicle by means of a flexible shaft 27 which, as shown in Figure 1, may be connected to the gear wheel attached to the front wheel of the vehicle to which the speedometer is connected. Obviously the train of gearing 25 may be connected to any convenient rotating part.

Having thus described the invention, I claim:

1. An automatic lubricator comprising a cylinder having an inner shoulder and an extension, a piston within the cylinder and limited in its rearward movement by the said inner shoulder, a contractile spring connecting the pistons with the extension of the cylinder, a plurality of small cylinders connected with the main cylinder, pistons in the small cylinders connected with the piston of the main cylinder, valved tubes connected with the small cylinders and with a source of lubricant supply independent of the main cylinder, valved tubes connected with the small cylinders for conveying the lubricant therefrom to the parts to be lubricated and means for supplying fluid pressure to the extension of the main cylinder to move the piston therein in opposition to the spring coacting therewith.

2. In an automatic lubricator, the combination with a cylinder, a piston therein, and lubricant mechanism actuated by said piston, of a fluid pressure reservoir, a pipe between the fluid pressure reservoir and the said cylinder, a casing in the length of the pipe and in communication with the atmosphere and with the fluid pressure reservoir, valves controlling the communication between the said casing and the atmosphere and fluid pressure reservoir, a shaft provided with tappets for alternately operating the said valves, and a train of gearing for operating the said shaft at the required speed.

3. An automatic lubricator, comprising a tank for the lubricant, a fluid pressure reservoir, a main cylinder, a main piston therein, small cylinders connected with the main cylinder, pistons in the small cylinders connected with the said main piston for movement therewith, valved tubes connecting the small cylinders with the tank containing the lubricant, valved, delivery tubes connecting with the small cylinders, a spring for moving the main piston in one direction, a pipe connecting the main cylinder with the fluid pressure reservoir, a casing in the length of said pipe having communication with the fluid pressure reservoir and with the atmosphere, valves for controlling the communication between said casing and the atmosphere and fluid pressure tank, a shaft provided with tappets for alternately operating the said valves, and a train of gearing for operating the said shaft at required speed.

In testimony whereof I affix my signature.

CICERO WILL COURCIER. [L. S.]